United States Patent
Oswald

(10) Patent No.: US 6,805,525 B2
(45) Date of Patent: Oct. 19, 2004

(54) DRIVE PIN FOR FASTENING TO A SHEET-METAL FRAMING MEMBER

(75) Inventor: Robert C. Oswald, Fountain Hills, AZ (US)

(73) Assignee: HKN Associates, LLC, Snellville, GA (US)

( * ) Notice: Subject to any disclaimer, the term of this patent is extended or adjusted under 35 U.S.C. 154(b) by 18 days.

(21) Appl. No.: 09/734,301

(22) Filed: Dec. 12, 2000

(65) Prior Publication Data

US 2002/0071741 A1 Jun. 13, 2002

(51) Int. Cl.⁷ ................................................. F16B 15/00
(52) U.S. Cl. .................... 411/499; 411/453; 411/440
(58) Field of Search .............................. 411/440, 441, 411/451.1, 452, 453, 454, 451.3, 451.4, 493, 499

(56) References Cited

U.S. PATENT DOCUMENTS

| | | | |
|---|---|---|---|
| 1,485,202 A | * | 2/1924 | Rosenberg |
| 2,075,411 A | * | 3/1937 | Von Mertens |
| 2,327,556 A | * | 8/1943 | Purinton |
| 3,764,278 A | * | 10/1973 | Ivanier |
| 3,877,340 A | * | 4/1975 | Knohl |
| 3,977,142 A | * | 8/1976 | Dove |
| 5,261,770 A | * | 11/1993 | Hoepker |
| 5,375,957 A | * | 12/1994 | Golledge |
| 5,489,179 A | | 2/1996 | Gabriel et al. ............... 411/453 |
| 5,642,974 A | * | 7/1997 | Gabriel |
| 5,867,958 A | * | 2/1999 | Ditka |

OTHER PUBLICATIONS

"Single Face Die Dimensions For Boltmaker Machines" by REED–RICO, p. 104.
"Metallic Drive Screws—Type U" American Standards Association Standards—ASA B18.6.4, p. 73.

* cited by examiner

*Primary Examiner*—Flemming Saether
(74) *Attorney, Agent, or Firm*—Lowell W. Gresham; Jordan M. Meschkow; Meschkow & Gresham, PLC

(57) ABSTRACT

A drive pin (20) for the fastening of a material (22) to a sheet-metal framing member (24) with an automatic nailer is provided. The drive pin (20) has a head (26), a substantially cylindrical shank (28) having a base diameter (30) in a range of 0.0625 to 0.125 inch, and a ballistic tip (40) configured to penetrate the material (22) and the framing member (24) under force of the automatic nailer. A knurl (42) is formed upon the shank (28). The knurl (42) has at least seven and no more than fourteen substantially parallel spiral grooves (32) having a minor diameter (58) less than the shank base diameter (30). Adjacent spiral grooves (32) are separated by substantially unbroken spiral ridges (34) having a major diameter (62) greater than the shank base diameter (30). The spiral grooves (32) and ridges (34) together form a plurality of threads (44) rolled full upon the shank (28) at an angle (54) of substantially 26±2 degrees relative to an axis (46) of the shank (28).

20 Claims, 1 Drawing Sheet

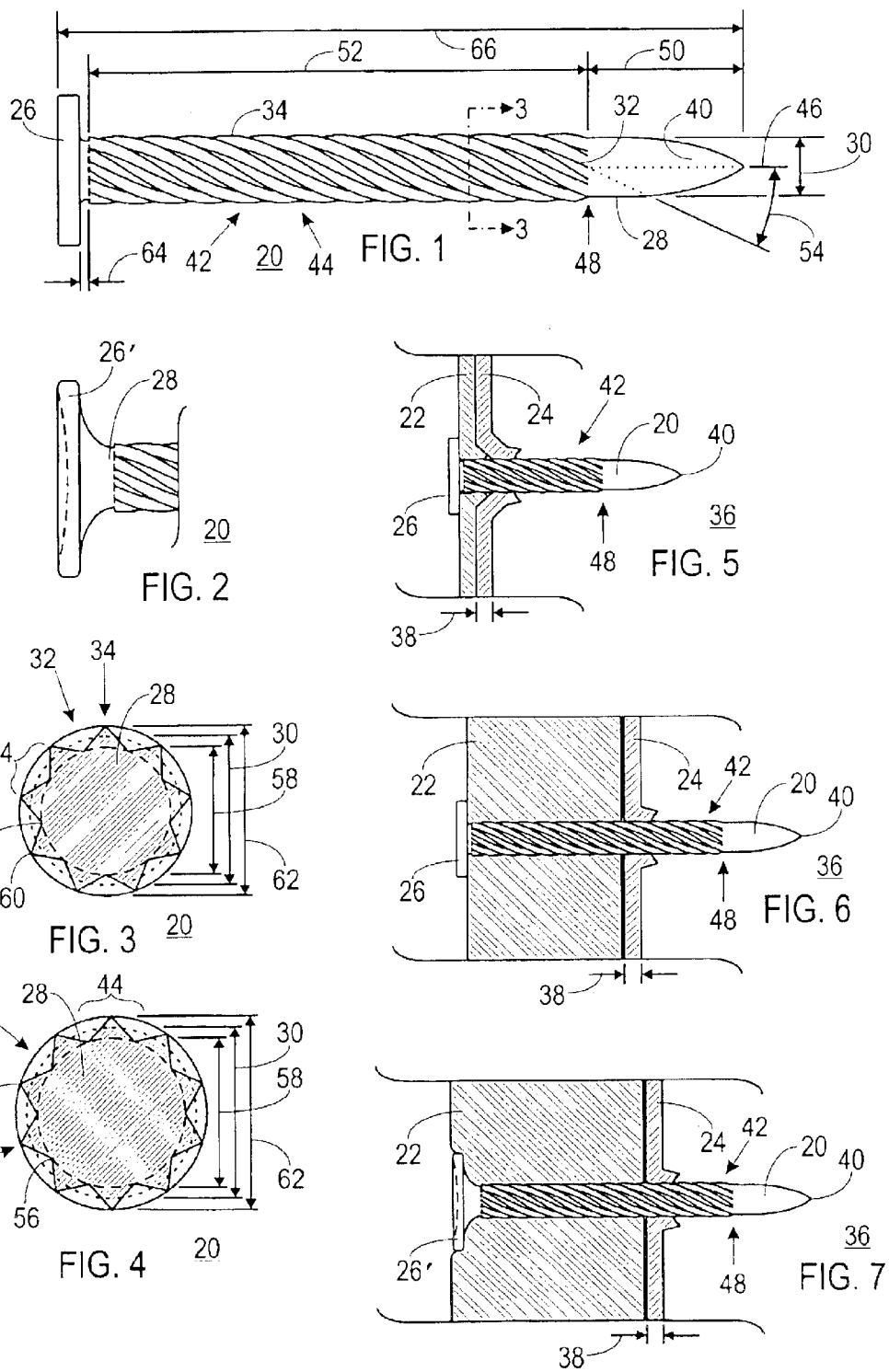

DRIVE PIN FOR FASTENING TO A SHEET-METAL FRAMING MEMBER

TECHNICAL FIELD OF THE INVENTION

The present invention relates to the field of metallic fasteners. More specifically, the present invention relates to the field of drive pins for attachment of material to sheet metal.

BACKGROUND OF THE INVENTION

There exists a need to fasten material to a relatively thin (i.e., sheet) metal substrate. This need may be typified by the fastening of cladding or sheathing material to structural steel framing members, the fastening of components to metal tubing or structural forms, etc. This need is typically fulfilled by welding, brazing, gluing, riveting, screwing, or pinning.

When the material to be fastened is another metal, welding or brazing is often used. These fastening methods have the advantage of strength and component cost. Welding and brazing are clean, fast and efficient when used in automated assembly operations. This may be seen in the construction of automobile bodies and frames on robotic assembly lines. When manual fastening is required, as in field construction, welding and brazing become time-consuming and labor intensive.

Under certain low-stress conditions, a suitable construction adhesive may be used to fasten a material to a metal substrate. Such assemblies typically require a high degree of conformity between the material and the substrate. For example, to be successfully glued to a framing member, the surface of a rigid sheet material must lie flush to the surface of the framing member. Even a small misalignment may result in a poor bond. For these and other reasons, gluing is restricted to specific forms of construction and is generally not practical in the field.

Riveting, screwing, and pinning are generally the methods of choice for fastening materials in the field. Each of these methods has its strengths and weaknesses. Riveting typically requires access to both sides of the join, i.e., to the "face" of the material and the "back" of the metal substrate. This is not always practical, nor always possible. Additionally, a rivet is a double-headed fastener, having one head preformed and the second head formed in situ. This is typically a forceful operation. The force needed to deform of the tip of the rivet to form the second head would generally deform a thin metal substrate. Riveting is therefore generally limited to the thicker metals.

Screwing and bolting may be used with materials of virtually any thickness. Bolting, i.e., the use of a bolt with a nut, provides a very strong bond. Bolting is also repeatable, i.e., the material may be repeatedly attached and removed from the substrate as required. This makes bolting the method of choice where either extreme strength or removability is desired. However, bolting typically requires pre-drilled holes, two fasteners (the bolt and the nut), and is labor intensive. Bolting is therefore time consuming and expensive. Bolting may also require access to both sides of the join, thereby limiting its practicality.

A single-fastener variant of bolting may be used where a hole is pre-drilled and threaded in the metal substrate, thereby serving as the nut. Alternatively, in lieu of a tapped hole, a nut may be pre-positioned at a pre-drilled hole in the metal substrate by any of a plurality of methods (e.g., welds, recesses, clips, etc.) well known to those skilled in the art. Since the "nut" is in place, only the bolt need be used to fasten a material to the metal substrate and access to both sides of the join is not required. This significantly improves in-field efficiency. Unfortunately, overall efficiency is reduced and costs increased by the requisite pre-processing, i.e., drilling and tapping of the substrate and/or affixment of the nuts. The tapped-hole bolting method is also not generally practical for thin metal substrates, e.g., those of less than 0.125 inch.

For thin metal substrates, significant installation efficiency over bolting may be realized by screwing the material to the metal substrate. Self-tapping screws cut their own threads in metal substrates with pre-drilled holes. Self-drilling screws eliminate the need for pre-drilled holes. Each of these screws may be used to rapidly and efficiently fasten the material to the substrate in the field.

Self-drilling screws drill their own holes in the material and the metal substrate. This makes them ideal for field installation of drywall, sheathing, and general framing applications. The use of self-drilling screws is especially efficient when such screws are used with an automatic (i.e., pneumatic or electric) screw gun.

Pinning presents the most efficient method, from a labor and time perspective, of fastening a material to a thin metal substrate. In this method, a drive pin percussively penetrates the material and the metal substrate by an automatic (pneumatic, electric, fuel cell, or powder-actuated) nailer. Since most automatic nailers use drive pins that are belt, coil, or strip fed, an operation such as attaching gypsum sheathing to steel framing becomes rapid and efficient. Only a fraction of a second is required to drive each drive pin in a sheet of material. This is a marked improvement over screwing, where a few seconds per screw is required.

A disadvantage of pinning is that it conventionally has less holding power than screwing. This makes pinning less desirable where great strength is needed. This is especially true of pullout resistance or grip (i.e., strength in a direction perpendicular to the material surface). The grip of a pinned join (assuming a proper fastening operation) is a function of the thickness and material of the metal substrate, and the dimensions and configuration of the drive pin.

Conventional drive pins are fluted to increase grip. That is, they have grooves and ridges upon their shanks configured to deform upon use to strengthen the join. These fluted-shank pins may have either straight or spiraled grooves. Straight grooves are conventionally used with thicker metal substrates where a wedging action between the pin and the substrate contributes to the strength of the join. Such straight-fluted pins do not produce desirable joins with thin substrates, e.g., conventional steel framing members.

For thin substrates, i.e., less than 0.25 inch, a spirally fluted drive pin, also known as a drive screw, is preferred. The drive pin is configured to penetrate the material and the metal substrate. To accomplish this, the drive pin conventionally has a ballistic (i.e., bullet-shaped) tip configured to pierce the substrate and create an opening therein substantially equal to the diameter of the shank. The spiral flutes, i.e., the groves and ridges, then spin the drive pin while substantially simultaneously cutting threads into the substrate and deforming to lock the drive pin therein. It has been found that, under normal conditions, thicker metal substrates require shallower twist angles, as the thicker material imposes a greater resistance to the spinning of the drive pin.

Typically, the spiral flutes subtend an angle of approximately ten degrees relative to an axis of the shank. These conventional ten-degree-spiral drive pins work well for thicker sheet-metal substrates, e.g., those thicker than approximately 10 gauge (0.1180 inch). Such thicknesses may be found on shipping containers, for which the drive pins were first developed, and other high-stress applications. For the thinner gauge sheet-metal framing members typically used on commercial and residential buildings, i.e., 12 to 25 gauge (0.0966 to 0.0179 inch) the performance rapidly decreases.

Because the conventional drive pin was developed for use with thicker metal substrates, certain concessions in pin design have become common in the industry. One such concession is the use of truncated or flattened threads. In such pins, the ridge in the groove-and-ridge arrangement is formed with a flat top. This truncation reduces the number of fine chips torn from the spiral ridges during the impact fastening operation. Few fine chips result in an increase in average chip size. The larger chips act as better wedges, thereby providing a better grip in thicker substrates. In thinner substrates, however, this truncation results in less of a thread being cut into the substrate. Since it is the depth and quality of the thread that provides the grip with thinner substrates, a reduction in thread depth and quality results in a lessened grip.

Several attempts have been made to produce a drive pin with increased grip in the thinner sheet metals. The most successful of which is the use of spiral flutes cut with annular rings. The annular rings cut the thin metal more cleanly, thereby increasing the quality of the threads and improving the grip. Unfortunately, this approach offers only marginal improvement when used with the thinnest sheet metals, i.e., 18 to 25 gauge (0.0428 to 0.0179 inch), often used for framing members in light commercial and residential construction.

Additionally, steel is often recycled. The makeup of virgin (new) steel can be controlled to very close tolerances. This means that virgin steel is substantially homogeneous, having the same balance of iron, carbon, and other materials throughout. This is not always true of recycled steel. Recycled steel may have spots or areas containing more or less carbon and/or other materials than iron. These spots may vary widely in hardness, resulting in brittle areas and soft areas in the same material. Since lightweight structural framing members are often produced from recycled steel, conventional drive pins have problems providing sufficient grip in all cases.

SUMMARY OF THE INVENTION

Accordingly, it is an advantage of the present invention that a drive pin for fastening a material to a metal base member is provided.

It is another advantage of the present invention that a drive pin is provided that is configured specifically for thin structural framing members.

It is another advantage of the present invention that a drive pin is provided that provides good grip in framing members of varying thicknesses.

It is another advantage of the present invention that a drive pin is provided that provides good grip in a framing member having varying hardness.

It is another advantage of the present invention that a drive pin is provided that provides a thread formed full upon the shank.

The above and other advantages of the present invention are carried out in one form by a drive pin for the fastening of a material to a metal base member with an automatic nailer. The drive pin has a head, a substantially cylindrical shank upon which a knurl is rolled having a plurality of substantially parallel spiral grooves, each groove subtending an angle of at least 15 degrees relative to an axis of the shank, and a ballistic tip configured to penetrate the material and the metal base member under force of the automatic nailer.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 1 shows a side view of a drive pin for fastening a material to a metal base member in accordance with a preferred embodiment of the present invention;

FIG. 2 shows a side view of a cupped bugle head for the drive pin of FIG. 1 in accordance with a preferred embodiment of the present invention;

FIG. 3 shows a cross-sectional view of the drive pin of FIG. 1 demonstrating a first base diameter having nine groves and nine ridges in accordance with a preferred embodiment of the present invention;

FIG. 4 shows a cross-sectional view similar to that of FIG. 3 but demonstrating a second base diameter having ten grooves and ten ridges in accordance with a preferred embodiment of the present invention;

FIG. 5 shows a cross sectional view of an assembly in which the drive pin of FIG. 1 fastens a sheet-metal material to a sheet-metal base member in accordance with a preferred embodiment of the present invention;

FIG. 6 shows a cross-sectional view of an assembly in which the drive pin of FIG. 1 fastens a rigid construction material to a sheet-metal base member in accordance with a preferred embodiment of the present invention; and FIG. 7 shows a cross-sectional view of an assembly in which The drive pin of FIG. 1 has the head of FIG. 2 and fastens a construction material to a sheet-metal base member in accordance with a preferred embodiment of the present invention.

DETAILED DESCRIPTION OF THE PREFERRED EMBODIMENTS

FIG. 1 shows a side view of a drive pin 20 for fastening a material to a metal base member in accordance with a preferred embodiment of the present invention. FIG. 2 shows a side view of an alternative cupped bugle head 26' for drive pin 20. FIGS. 3 and 4 show cross-sectional views of drive pin 20 demonstrating a shank 28 having differing base diameters 30 and numbers of spiral grooves 32 and ridges 34 in accordance with a preferred embodiments of the present invention. FIGS. 5, 6, and 7 show cross-sectional views of construction assemblies 36 in which variations of drive pin 20 fasten differing materials 22 to sheet-metal base members 24 in accordance with preferred embodiments of the present invention. The following discussion refers to FIGS. 1 through 7.

Drive pin 20 is a nail-like device for fastening material 22 to metal base member 24 using an automatic (e.g., pneumatic, gas, electric, or powder-activated) nailer (not shown) to effect construction assembly 36 (FIGS. 5, 6, and 7). For purposes of simplicity, this discussion assumes that metal base member 24 is a sheet-metal framing member (hereinafter framing member 24). Those skilled in the art will appreciate that this is not a limitation of the present invention, and metal base member 24 may be a sheet-metal framing member, metal angle or tubing, or any other sheet-metal substrate.

Drive pin 20 is configured for use with a framing member 24 having a thickness 38 between 0.0179 and 0.0966 inch (12 and 25 gauge), inclusively. Desirably, framing member 24 has a thickness 38 of no more than 0.0428 inch (18 gauge).

The use of the automatic nailer to insert drive pin 20 is presumed. Drive pin 20 is not a nail and is not configured for manual (i.e., hammer) insertion. Desirably, drive pin 20 is formed of a hardened steel (e.g., C1060 steel) to withstand the forces imposed by the automatic nailer. Those skilled in the art will appreciate that embodiments of drive pin 20 may be made of differing materials to suit specific requirements. Additionally, drive pin 20 may be coated or clad as desired. The use of differing materials and/or coatings or claddings does not depart from the spirit of the present invention.

Drive pin 20 has a substantially cylindrical shank 28 having a head 26 on one end and an ogival-shaped (i.e., ballistic or bullet-shaped) tip 40 on the other end. Ballistic tip 40 is configured to penetrate material 22 and framing member 24 under force of the automatic nailer. To accomplish this, ballistic tip 40 is preferably bullet shaped. This shape allows ballistic tip 40 to pierce framing member 22 and create an opening therein substantially equal to base diameter 30 of shank 28 with minimal tearing and deformation. This provides an appropriate substantially cylindrical "clean" opening suited for the formation of threads (discussed hereinafter)

Head 26 is typically a flat head (FIG. 1), suitable for fastening most rigid and semi-rigid materials 22 (FIGS. 5 and 6). Alternative heads 26 may be used to hold specific types of material 22. For example, when material 22 is a gypsum construction material, such as drywall, (FIG. 7), it may be desirable that head 26 be recessed into and below the surface of material 22 to allow for surface finishing. This may be accomplished by using cupped bugle head 26' (FIG. 2). Those skilled in the art will appreciate that the use of variant heads does not depart from the spirit of the present invention.

Shank 28 has a knurl 42. Knurl 42 is formed of a plurality of threads 44 rolled full upon a portion of shank 28. Threads 44 produce a plurality of substantially parallel spiral grooves 32 where adjacent ones of spiral grooves 32 are separated by spiral ridges 34. That is, grooves 32 and ridges 34 together form threads 44.

The automatic nailer imparts an axial linear force to drive pin 20, i.e., along an axis 46 of shank 28. Threads 44 (i.e., grooves 32 and ridges 34) are formed with independent starts 48 at substantially the same distance 50 from tip 40 and have substantially equal lengths 52 (FIG. 1). Therefore, threads 44 encounter the opening in framing member 24 substantially simultaneously. Threads 44 (i.e., grooves 32 and ridges 34) are also formed on shank 28 so as to subtend an angle 54 relative to shank axis 46. This causes a portion of the force imparted to drive pin 20 to be converted from linear to rotary motion when threads 44 encounter the opening formed in framing member 24 by ballistic tip 40. It is this conversion of linear to rotary force that allows threads 44 to cut into framing member 24, thereby forming a good join between material 22 and framing member 24.

If angle 54 is too shallow, i.e., less than 15 degrees relative to shank axis 46, the threads formed in framing member 24 are also shallow and the grip binding material 22 to framing member 24 is weak. If angle 54 is too steep, i.e., greater than 30 degrees relative to shank axis 46, too much of the axial linear force imparted to drive pin 20 would have to be converted to a rotary force, resulting in a tearing of the opening in framing member 24 and a loss of at least part of the desired grip. Preferably, threads 44 are configured so that angle 54 is 26±2 degrees relative to shaft axis 46. This value of angle 54 provides a strong grip over varying thicknesses and hardness of framing member 24.

Threads 44 are rolled full upon shank 28. This means that ridges 34, constituting the outer portions of threads 44, are fully formed and not truncated. By being fully formed, threads 44 cut into and deform the opening in framing member 22 formed by ballistic tip 40. Referring to FIGS. 1, 3, and 4, shank 28 is of base diameter 30. The process of rolling threads 44 onto shank 28 has deformed shank 28 to produce spiral grooves 32 and spiral ridges 34. Nadirs 56 of spiral grooves 32 form a minor diameter 58 less than base diameter 30. Similarly, apexes 60 of ridges 34 form a major diameter 62 greater than base diameter 30.

The number of threads 44 (i.e., grooves 32) rolled upon shank 28 to form knurl 42 is a function of base diameter 30 of shank 28. Desirably, base diameter 30 is in the range of 0.0625 to 0.125 inch so as to produce a suitable join when framing member 24 is formed of a thin sheet metal. Knurl 42 would therefore have at least seven and no more than fourteen spiral threads 44. In the preferred embodiment of FIG. 3, base diameter 30 of shank 28 is 0.098±0.003 inch and there are nine threads 44. Minor diameter 58 of nadirs 38 of grooves 32 is 0.084±0.003 inch, and major diameter 62 of ridges 34 is 0.112±0.003 inch. Similarly, in the preferred embodiment of FIG. 4, base diameter 30 is 0.110±0.003 inch and there are ten threads 44. Minor diameter 58 is 0.096±0.003 inch, and major diameter 62 is 0.124±0.003 inch. Those skilled in the art will appreciate that other values may be used for base, minor, and major diameters 30, 58, and 62 (leading to other numbers of threads 44) without departing from the spirit of the present invention.

For the sake of simplicity, FIGS. 3 and 4 show threads 44 as having sharp apexes and nadirs of ridges 34 and grooves 32, respectively. Those skilled in the art will appreciate that ridges 34 and grooves 32 have radii at their apexes and nadirs, which radii are typically not visible at the scale of FIGS. 3 and 4.

Threads 44 are desirably unbroken. That is, each spiral groove 32 and ridge 34 has no breaks or other interruptions. This allows spiral ridges 34 to slice through the edge of the opening formed in framing member 22 by ballistic tip 40 like a knife. The presence of a break, such as an annular ring, interrupting ridge 34 would produce a demarcation. Such a demarcation would cut framing member 22 like a chisel. Such a chisel action would produce chips and weaken the grip binding material 22 to framing member 24.

FIG. 5 shows assembly 36 in which material 24 is a second sheet metal (e.g., in a join of framing members where framing member 22 is a first sheet metal). Drive pin 20 has a flat head 26 as depicted in FIG. 1. Threads 44, i.e., knurl 42, are formed close under head 26 to allow for the thinness of material 22. By being rolled close under head 26, a head-to-knurl distance 64 is minimal in keeping with good machining practices, preferably within 0.005 inch. Additionally, the overall length 66 (FIG. 1) of drive pin 20 may be less than in other embodiments, e.g., 0.75 inch, though it will be appreciated that this is not a requirement of the present invention.

FIG. 6 shows assembly 36 in which material 24 is a typical rigid construction material (e.g., plywood). Drive pin 20 again has a flat head 26 as depicted in FIG. 1. Threads 44, however, are formed loose under head 26 as material 22 has substantial thickness. By being rolled loose under head 26, a head-to-knurl distance 64 of 0.050 inch or greater is permissible, thereby lessening the machining requirements of the rolling process. Since the closeness of knurl 42 to head 26 is not a factor, a clear area (not shown) may exist on shank 28 between head 26 and knurl 42. The overall length 66 (FIG. 1) of drive pin 20 may be any length common in the industry, e.g., 1.375, 2.000, and 2.500 inch.

FIG. 7 shows assembly 36 in which material 24 is a gypsum construction material, such as drywall. Drive pin 20 has a cupped bugle head 26' as depicted in FIG. 2. This allows head 26' to be slightly recessed into material 22 so that the surface of material 22 may be filled and finished. The overall length 66 (FIG. 1) of drive pin 20 may be any length common in the industry. Those skilled in the art will appreciate that when material 24 is external gypsum sheathing, head 26' need not be recessed as depicted in FIG. 7.

In summary, the present invention teaches drive pin 20 for fastening material 22 to metal base member 24. Drive pin 20 is configured specifically for use with a thin structural framing member 24, e.g., preferably no thicker than 0.0966 inch and more preferably no thicker than 0.0428 inch. Drive pin 20 provides good grip in framing members 24 of varying thicknesses. Drive pin 20 provides good grip in framing member 24 having varying hardness. Drive pin 20 has knurl 42 of thread 44 formed full upon shank 28.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A drive pin for the fastening of a material to a sheet-metal framing member with an automatic nailer, said drive pin comprising:
    a substantially cylindrical shank, a first portion of which has a base diameter;
    a head coupled to said shank;
    a knurl rolled upon a second portion of said shank, said knurl having a plurality of substantially parallel spiral grooves, wherein said spiral grooves have a minor diameter less than said base diameter, and wherein each of said spiral grooves subtends an angle of at least 15 degrees relative to an axis of said shank; and
    an ogival-shaped tip coupled to said first portion of said shank and configured to penetrate said material and said sheet-metal framing member under force of said automatic nailer.

2. A drive pin as claimed in claim 1 wherein said spiral-groove angle is no greater than 30 degrees relative to said shank axis.

3. A drive pin as claimed in claim 2 wherein said spiral groove angle is substantially 26±2 degrees relative to said shank axis.

4. A drive pin as claimed in claim 1 wherein:
    adjacent ones of said spiral grooves are separated by spiral ridges;
    each of said spiral grooves and ridges has a substantially equal length; and
    each of said spiral ridges is substantially unbroken throughout said length.

5. A drive pin as claimed in claim 4 wherein:
    said base diameter has a range of 0.0625 to 0.125 inch; and
    said spiral ridges have a major diameter greater than said base diameter.

6. A drive pin as claimed in claim 5 wherein:
    said base diameter is 0.098±0.003 inch;
    said minor diameter is 0.084±0.003 inch; and
    said major diameter is 0.112±0.003 inch.

7. A drive pin as claimed in claim 5 wherein:
    said base diameter is 0.110±0.003 inch;
    said minor diameter is 0.096±0.003 inch; and
    said major diameter is 0.124±0.003 inch.

8. A drive pin as claimed in claim 5 wherein:
    said spiral grooves and ridges together form a plurality of threads; and
    each of said threads is rolled full upon said shank.

9. A drive pin as claimed in claim 1 wherein, when said material is sheet metal, said knurl is rolled tight to said head.

10. A drive pin as claimed in claim 1 wherein, when said material is gypsum sheathing, said head is a cupped bugle head.

11. A drive pin as claimed in claim 1 wherein:
    said knurl has at least seven of said spiral grooves; and
    each of said spiral grooves has an independent start.

12. A drive pin as claimed in claim 11 wherein said knurl has no more than fourteen of said spiral grooves.

13. A construction assembly effected by an automatic nailer, said construction assembly comprising:
    a sheet-metal framing member;
    a material attached to said sheet-metal framing member; and
    a drive pin attaching said material to said sheet-metal framing member, said drive pin comprising:
        a substantially cylindrical shank;
        a head coupled to said shank;
        a knurl formed of a plurality of threads rolled full upon said shank to produce a plurality of substantially parallel spiral grooves, wherein each of said spiral grooves subtends an angle of no less than 15 and no greater than 30 degrees relative to an axis of said shank; and
        an ogival-shaped tip coupled to said shank and configured to penetrate said material and said sheet-metal framing member under force of said automatic nailer.

14. A construction assembly as claimed in claim 13 wherein said spiral groove angle is substantially 26±2 degrees relative to said shank axis.

15. A construction assembly as claimed in claim 13 wherein said sheet-metal framing member has a thickness of 0.0179 to 0.0966 inch.

16. A construction assembly as claimed in claim 15 wherein said sheet-steel framing member has a thickness of no more than 0.0428 inch.

17. A construction assembly as claimed in claim 13 wherein:
    said material is a sheet metal; and
    said knurl is rolled tight under said head.

18. A construction assembly as claimed in claim 13 wherein:
    said material is gypsum sheathing; and
    said head is a cupped bugle head.

19. A construction assembly as claimed in claim 13 wherein:

said knurl has at least seven and no more than fourteen of said spiral grooves;

adjacent ones of said spiral grooves are separated by spiral ridges;

each of said spiral grooves and ridges has a substantially equal length; and each of said spiral ridges is substantially unbroken throughout said length.

20. A drive pin for the fastening of a material to a sheet-metal framing member with an automatic nailer, said drive pin comprising:

a substantially cylindrical shank having a base diameter in a range of 0.0625 to 0.125 inch;

a head coupled to a first end of said shank;

a knurl formed of at least seven and no more than fourteen substantially parallel spiral grooves having a minor diameter less than said base diameter, wherein adjacent ones of said spiral grooves are separated by substantially unbroken spiral ridges having a major diameter greater than said base diameter, and wherein said spiral grooves and ridges together form a plurality of threads rolled full upon a portion of said shank at an angle of substantially 26±2 degrees relative to an axis of said shank;

an ogival-shaped tip coupled to a second end of said shank and configured to penetrate said material and said framing member under force of said automatic nailer.

* * * * *